United States Patent
Wu et al.

(10) Patent No.: US 11,374,515 B1
(45) Date of Patent: Jun. 28, 2022

(54) OPERATION METHOD AND OPERATION DEVICE OF MOTOR DRIVER FOR DRIVING MOTOR

(71) Applicant: INDUSTRIAL TECHNOLOGY RESEARCH INSTITUTE, Hsinchu (TW)

(72) Inventors: Chih-Chiang Wu, Zhudong Township (TW); Yun-Huan Li, Hsinchu (TW); Hsin-Ping Chou, Hsinchu (TW); Shih-Hsiang Wu, Yuanlin (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/136,225

(22) Filed: Dec. 29, 2020

(51) Int. Cl.
*H02P 29/60* (2016.01)
*H02P 6/28* (2016.01)
*H02K 19/10* (2006.01)
*H02K 19/08* (2006.01)

(52) U.S. Cl.
CPC ............. *H02P 6/28* (2016.02); *H02K 19/08* (2013.01); *H02K 19/106* (2013.01); *H02P 29/60* (2016.02)

(58) Field of Classification Search
CPC .... H02P 6/28; H02P 21/22; H02P 6/10; H02P 7/291; H02P 23/28; H02P 29/60; H02K 19/10
See application file for complete search history.

(56) References Cited

U.S. PATENT DOCUMENTS

| | | | | |
|---|---|---|---|---|
| 4,079,297 A * | 3/1978 | Norrell | ...................... | H02P 5/52 318/696 |
| 4,259,621 A * | 3/1981 | Jakobsen | .................. | H02P 5/51 318/113 |
| 7,026,784 B2 * | 4/2006 | Shimizu | ............. | G05B 23/0235 318/400.13 |
| 8,072,174 B2 * | 12/2011 | Campbell | ............. | H02P 29/045 318/600 |
| 9,595,907 B2 * | 3/2017 | Marohl | ................. | H02P 27/085 |
| 2009/0128078 A1 | 5/2009 | Chiu | | |

(Continued)

FOREIGN PATENT DOCUMENTS

| CN | 1898858 A | 1/2007 |
|---|---|---|
| CN | 101176253 A | 5/2008 |

(Continued)

OTHER PUBLICATIONS

Aly et al., "Design and Validation of SVPWM Algorithm for Thermal Protection of T-Type Three-Level Inverters," 2015 IEEE International Telecommunications Energy Conference (INTELEC), Osaka, Japan, Oct. 18-22, 2015, 6 pages.

(Continued)

*Primary Examiner* — Thai T Dinh
(74) *Attorney, Agent, or Firm* — Birch, Stewart, Kolasch & Birch, LLP (57) ABSTRACT

An operation method and an operation device of a motor driver for driving a motor are provided. The operation method includes: establishing a hysteresis control method; and adjusting a switch frequency of a power module for operating the motor by using the hysteresis control method according to a change of rotation speed of the motor and a current switch frequency.

16 Claims, 6 Drawing Sheets

(56) References Cited

U.S. PATENT DOCUMENTS

| | | | | |
|---|---|---|---|---|
| 2012/0212167 A1* | 8/2012 | Wu | ............................ | H02P 6/14 318/400.13 |
| 2014/0197765 A1* | 7/2014 | Kim | ........................ | H02P 29/50 318/400.2 |
| 2014/0306638 A1* | 10/2014 | Wu | ........................ | H02P 21/20 318/504 |
| 2015/0333689 A1 | 11/2015 | Kudoh et al. | | |

FOREIGN PATENT DOCUMENTS

| | | |
|---|---|---|
| CN | 101420202 B | 8/2011 |
| CN | 102931838 A | 2/2013 |
| CN | 103701105 A | 4/2014 |
| CN | 103828221 A | 5/2014 |
| CN | 103875176 A | 6/2014 |
| CN | 105580267 A | 5/2016 |
| CN | 106026814 A | 10/2016 |
| CN | 103986319 B | 2/2017 |
| CN | 105577069 B | 2/2018 |
| CN | 108512251 A | 9/2018 |
| CN | 109823193 A | 5/2019 |
| CN | 110875710 A | 3/2020 |
| TW | M381039 U1 | 5/2010 |
| TW | I631354 B | 8/2018 |

OTHER PUBLICATIONS

Falck et al., "Active Thermal Control of IGBT Power Electronic Converters," IECON2015, Yokohama, Japan, Nov. 9-12, 2015, pp. 000001-000006.

Lemmens et al., "Optimal Control of Traction Motor Drives Under Electrothermal Constraints," IEEE Journal of Emerging and Selected Topics in Power Electronics, vol. 2, No. 2, Jun. 2014 (Date of publication Jan. 13, 2014), pp. 249-263.

Li et al., "Thermoelectric Cooling for Power Electronics Circuits: Modeling and Active Temperature Control," IEEE Transactions on Industry Applications, vol. 50, No. 6, Nov./Dec. 2014 (Date of publication Apr. 23, 2014), pp. 3995-4005.

Murdock et al., "Active Thermal Control of Power Electronics Modules," IEEE Xplore, 2003, pp. 1511-1515.

Van Der Broeck et al., "Methodology for Active Thermal Cycle Reduction of Power Electronic Modules," IEEE Transactions on Power Electronics, vol. 34, No. 8, Aug. 2019 (Date of publication Nov. 19, 2018), pp. 8213-8229.

Taiwanese Office Action and Search Report for Taiwanese Application No. 110100125, dated Oct. 25, 2021.

\* cited by examiner

OPERATION METHOD AND OPERATION DEVICE OF MOTOR DRIVER FOR DRIVING MOTOR

TECHNICAL FIELD

The disclosure relates in general to an operation method and an operation device, and more particularly to an operation method and an operation device of a motor driver for driving a motor.

BACKGROUND

With the rapid growth of the electric vehicle market, the motor driver for driving a motor (e.g., an inverter) is also developing towards high density and high efficiency. The motor driver with high density and high efficiency represents having high power output. Failure to effectively dissipate heat, or failure to respond to heat generation in time, can easily cause failure or damage of the driving system, and even increase the chance of danger.

Therefore, it is desired to provide a protection method for the motor driver which provides the maximum performance of the driving system under the demand of high density and high efficiency, in addition to preventing the destruction due to high temperature of the driving system.

SUMMARY

The disclosure is directed to an operation method and an operation device of a motor driver for driving a motor to solve the aforementioned problems.

According to one embodiment, an operation method of a motor driver for driving a motor is provided. The operation method includes: establishing a hysteresis control method; and adjusting a switch frequency of a power module for operating the motor by using the hysteresis control method according to a change of rotation speed of the motor and a current switch frequency.

According to another embodiment, an operation device of a motor driver for driving a motor is provided. The operation device includes a control unit configured for adjusting a switch frequency of a power module for operating the motor by a hysteresis control method according to a change of rotation speed of the motor and a current switch frequency.

The above and other embodiments of this disclosure will become better understood with regard to the following detailed description. The following description is made with reference to the accompanying drawings.

DETAILED DESCRIPTION

In the past, the thermal protection mechanism of automotive drive system was activated by detecting the temperature of the thermal resistor disposed on the power transistor once the temperature exceeded a predetermined value. However, due to the placement of the thermal resistor, the temperature measured by the thermal resistor is to detect the substrate temperature (which is lower) rather than the junction temperature of the power transistor (which is higher); in addition, the difference between the substrate temperature and the junction temperature increases as the load becomes heavier, resulting in a situation where the actual junction temperature has exceeded the load of the power transistor, but the thermal protection mechanism has not yet been activated.

Through the thermal protection mechanism provided by the disclosure, a hysteresis control method is developed by evaluating the junction temperature, so as to ensure that the motor driver operates in a safe and secure manner, and further to maximize the performance of the driving system.

Each embodiment of the disclosure will be described in detail below and illustrated with drawings. In addition to these detailed descriptions, the disclosure may be broadly implemented in other embodiments, and any easy substitution, modification, or equivalent variation of the described embodiments is included in the scope of the disclosure and is covered by the scope of the claims thereafter. In the description of the specification, many specific details and examples of embodiments are provided to provide the reader with a more complete understanding of the disclosure; however, these specific details and examples of embodiments should not be considered as limitations of the disclosure. In addition, well known steps or components are not described in detail to avoid unnecessary limitations of the disclosure.

In addition, the terms such as "equal to", "touch" and "reach" mentioned herein should be understood as including the value of the number itself; and terms such as "greater than", "above", "less than" and "below" should be understood as not including the value of the number itself.

Figure 1:
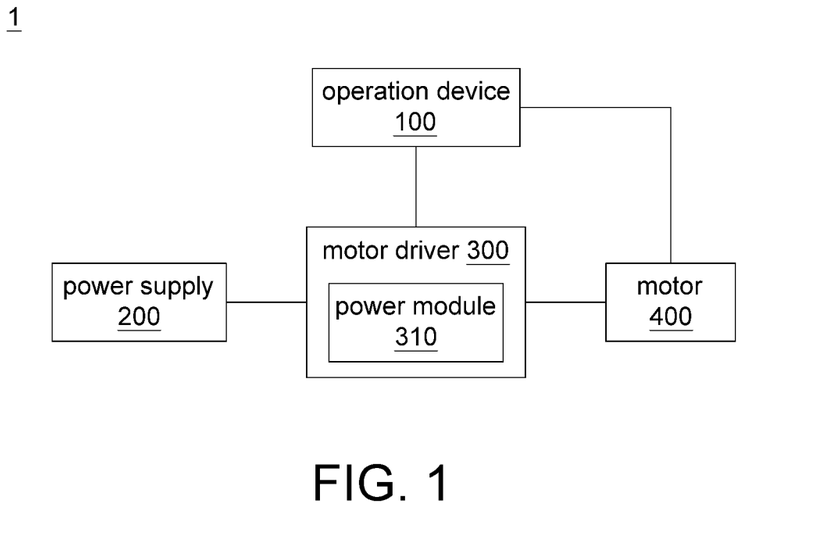
FIG. 1 is a simplified functional block diagram of a driving system according to one embodiment of the disclosure.
Figure 7A:
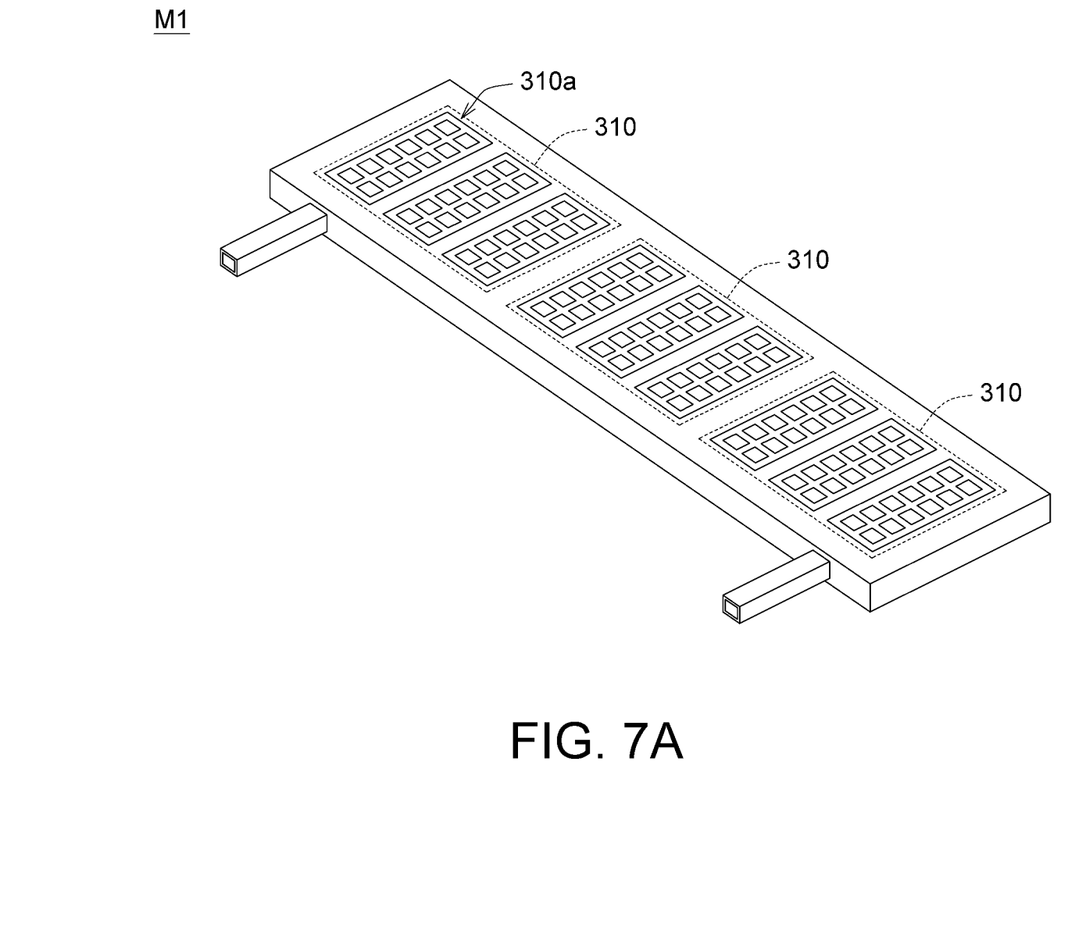
FIG. 7A is a schematic diagram showing a three-dimensional model of the power modules connected in parallel according to one embodiment of the disclosure.
Figure 7B:
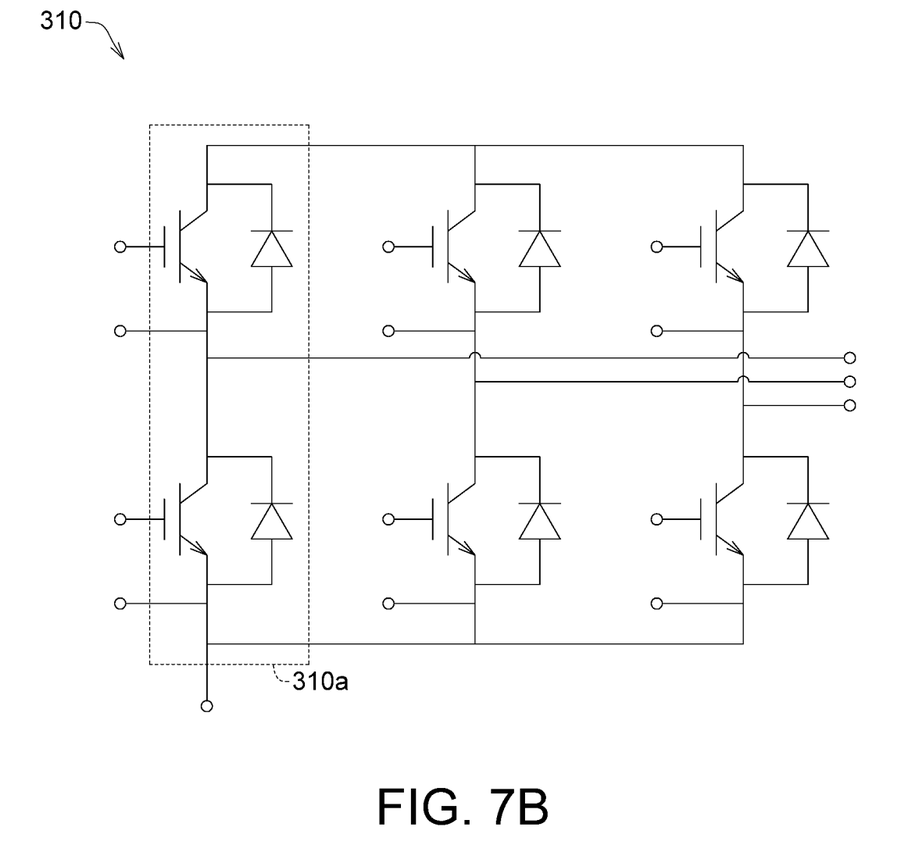
FIG. 7B is a circuit diagram of one power module of FIG. 7A.

Referring to FIG. 1, a simplified functional block diagram of a driving system 1 according to one embodiment of the disclosure is shown. The driving system 1 includes an operation device 100, a power supply 200, a motor driver 300 and a motor 400. The power supply 200 may be supplied with power by battery. The motor driver 300 may be coupled to the operation device 100, the power supply 200 and the motor 400. The motor driver 300 may include a plurality of power modules 310, and each power module 310 may include a plurality of power components, such as switching elements and diodes. The switching elements may be, but not limited to, insulated gate bipolar transistors (IGBTs), silicon carbide (SiC) transistors, gallium nitride (GaN) transistors, etc. In the present embodiment, the motor driver 300 with high power may be provided with three power modules 310 connected in parallel. As shown in FIG. 7A, the three power modules 310 represent three phases U, V, and W. Each phase is composed of three single sub-phases 310*a*, and one single sub-phase 310*a* includes two switching elements. FIG. 7B is a circuit diagram of one power module 310 of FIG. 7A. However, in practice, the number of power modules 310 may depend on the required wattage of power. For example, if the required output power is low, one power module 310 may be used, and each of the single sub-phases 310a of this power module 310 represents U, V and W phases respectively. The operation device 100 may switch the power module 310 to determine the rotation speed, position and torque of the motor 400, so that the motor 400 drives the movement of the mechanical carrier (such as wheels).

Figure 2:
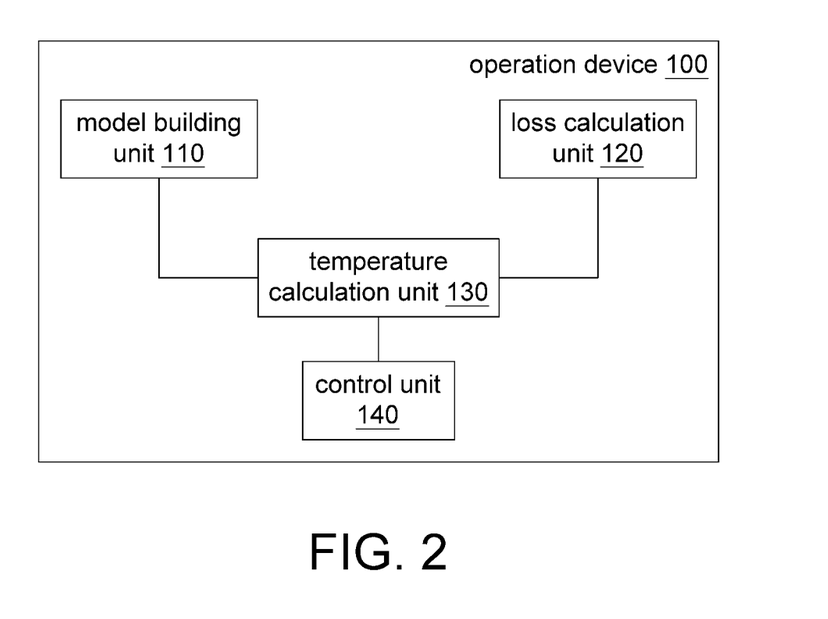
FIG. 2 is a simplified functional block diagram of the operation device of the motor driver according to one embodiment of the disclosure.
Figure 3:
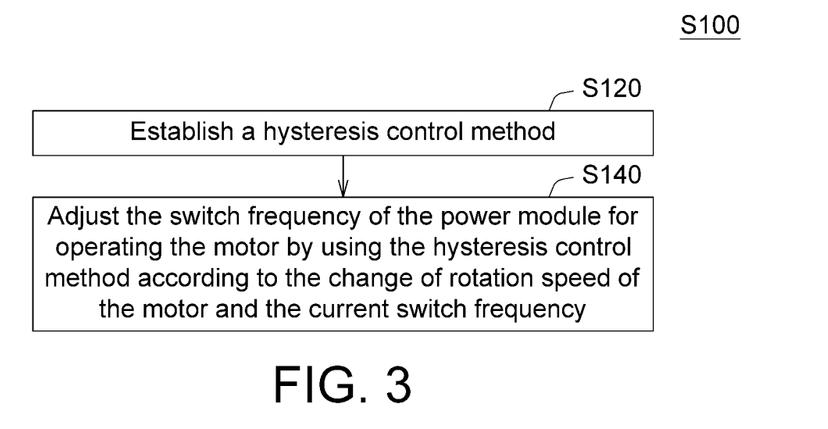
FIG. 3 is a flowchart of an operation method of the motor driver according to one embodiment of the disclosure.

FIG. 2 is a simplified functional block diagram of the operation device 100 of the motor driver 300 according to one embodiment of the disclosure. FIG. 3 is a flowchart of an operation method S100 of the motor driver 300 according to one embodiment of the disclosure.

Referring to FIGS. 1, 2 and 3, the operation device 100 may include a model building unit 110, a loss calculation unit 120, a temperature calculation unit 130, and a control unit 140 for adjusting a switch frequency. The model building unit 110, the loss calculation unit 120, the temperature calculation unit 130 and the control unit 140 may be implemented by a hardware circuit or software, for example, by an integrated circuit or a processing unit.

First, in step S120, a hysteresis control method may be established in the control unit 140 (which will be described in detail in FIGS. 5 and 6). Next, according to step S140, the control unit 140 may adjust the switch frequency of the power module 310 for operating the motor 400 by using the hysteresis control method according to the change of rotation speed of the motor 400 and the current switch frequency for operating the motor 400 (which will be described in FIG. 4). The adjustment for the switch frequency of the power module 310 described herein includes increasing and lowering the frequency, and represents a change in the ON/OFF switch frequency of the power module 310, but does not affect the rotation speed or torque of the motor 400, which in turn affects the energy of the motor 400 to drive the movement of the mechanical carrier.

Figure 4:
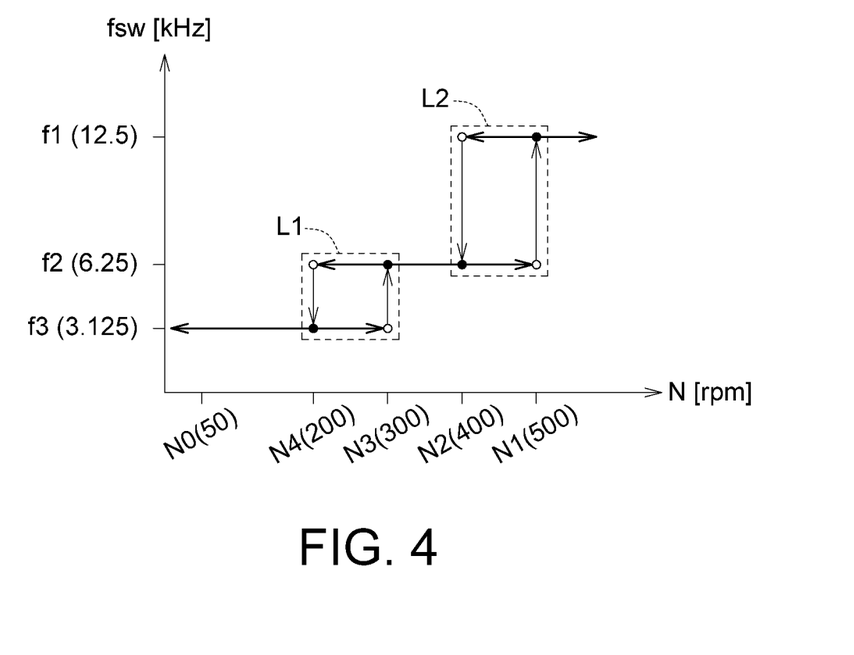
FIG. 4 illustrates a hysteresis control method according to one embodiment of the disclosure.

FIG. 4 illustrates a hysteresis control method according to one embodiment of the disclosure, which may be established in the control unit 140 as a control instruction by means of table building. Referring FIGS. 1, 2 and 4, the control unit 140 of the operation device 100 may adjust the switch frequency, for example, by lowering or increasing the switch frequency in a stepwise fashion, or by maintaining the current switch frequency, in accordance with the current switch frequency as the rotation speed of the motor 400 changes.

For example, in a condition that the current switch frequency (i.e. the switch current at present) is the frequency value f1 (12.5 kHz), when the rotation speed N of the motor 400 drops from the speed value N1 of 500 rpm and reaches the speed value N2 of 400 rpm, the switch frequency fsw may be adjusted down in a stepwise fashion from the frequency value f1 of 12.5 kHz to the frequency value f2 of 6.25 kHz accordingly, so as to prevent from failure of the power module 310 or even a chance of danger caused by the temperature of the power module 310 greater than its tolerable temperature when the power module 310 operates the motor 400 at the speed value N2 of 400 rpm with the frequency value f1 of 12.5 kHz. However, in a condition that the current switch frequency is the frequency value f1 (12.5 kHz), when the rotation speed of the motor 400 drops from the speed value N1 (500 rpm) and then rises up right before reaching the speed value N2 (400 rpm), the switch frequency fsw is still maintained at the frequency value f1 (12.5 kHz).

In brief, in a condition that the current switch frequency is the frequency value f1 (12.5 kHz), the switch frequency is maintained at the frequency value f1 (12.5 kHz) when the rotation speed N of the motor 400 changes in the range of N>400 rpm.

Similarly, in a condition that the current switch frequency is the frequency value f2 (6.25 kHz), when the rotation speed N of the motor 400 drops from the speed value N2 of 400 rpm and reaches the speed value N4 of 200 rpm, the switch frequency fsw may be adjusted down in a stepwise fashion from the frequency value f2 of 6.25 kHz to the frequency value f3 of 3.125 kHz accordingly, so that the temperature of the power module 310 does not exceed its tolerable temperature. However, in a condition that the current switch frequency is the frequency value f2 (6.25 kHz), when the rotation speed of the motor 400 drops from the speed value N2 (400 rpm) and then rises up right before reaching the speed value N4 (200 rpm), for example, rises up to 300 rpm or to 400 rpm, the switch frequency fsw is still maintained at the frequency value f2 (6.25 kHz). When the rotation speed of the motor 400 is greater than the speed value N2 (400 rpm) and has not yet reached the speed value N1 (500 rpm), the switch frequency fsw is also maintained at the frequency value f2 (6.25 kHz); until the rotation speed of the motor 400 reaches the speed value N1 (500 rpm), the switch frequency fsw may be adjusted up in a stepwise fashion from the frequency value f2 of 6.25 kHz to the frequency value f1 of 12.5 kHz accordingly instead of remaining at the frequency value f2 of 6.25 kHz, so as to maximize the performance of driving system 1 and to reduce high voltage ripple caused by low frequency operation.

In brief, in a condition that the current switch frequency is the frequency value f2 (6.25 kHz), the switch frequency is maintained at the frequency value f2 (6.25 kHz) when the rotation speed N of the motor 400 changes in the range of 200 rpm<N<500 rpm.

Similarly, in a condition that the current switch frequency is the frequency value f3 (3.125 kHz), when the rotation speed N of the motor 400 drops from the speed value N4 of 200 rpm to the speed value N0 of 50 rpm or even to 0 rpm, the switch frequency fsw is still maintained at the frequency value f3 (3.125 kHz). That is, when the rotation speed N of the motor 400 drops to a speed value N0, which is close to the blocked rotor state (i.e., a state where the rotor of the motor 400 is stationary), the temperature of the power module 310 does not exceed the tolerable temperature even if the motor 400 is operated at a frequency value f3 of 3.125 kHz. However, in a condition that the current switch frequency is the frequency value f3 (3.125 kHz), when the rotation speed of the motor 400 drops from the speed value N4 (200 rpm) and then rises up right before a rest, for example, rises up to 200 rpm, the switch frequency fsw is still maintained at the frequency value f3 (3.125 kHz). When the rotation speed of the motor 400 is greater than the speed value N4 (200 rpm) and has not yet reached the speed value N3 (300 rpm), the switch frequency fsw is also maintained at the frequency value f3 (3.125 kHz); until the rotation speed of the motor 400 reaches the speed value N3 (300 rpm), the switch frequency fsw may be adjusted up in a stepwise fashion from the frequency value f3 of 3.125 kHz to the frequency value f2 of 6.25 kHz accordingly instead of remaining at the frequency value f3 of 3.125 kHz, so as to maximize the performance of driving system 1 and to reduce high voltage ripple caused by low frequency operation.

In brief, in a condition that the current switch frequency is the frequency value f3 (3.125 kHz), the switch frequency is maintained at the frequency value f3 (3.125 kHz) when the rotation speed N of the motor 400 changes in the range of 0<N<300 rpm.

Thus, the hysteresis control method described herein may include at least one hysteresis loop, as described above. As shown in the embodiment in FIG. 4, the hysteresis control method may include two hysteresis loops L1 and L2. In the hysteresis loops L1 and L2, the switch frequency fsw of the power module 310 at a certain rotation speed N of the motor 400 may be determined according to the speed up or down state of the rotation speed N of the motor 400 and the current switch frequency. For example, in the hysteresis loop 1, in a condition that the rotation speed is 250 rpm (at the frequency value f2), when the rotation speed N of the motor 400 is in a speed down state and the rotation speed N reaches the speed value N4 (200 rpm), the switch frequency fsw is adjusted from f2 (6.25 kHz) down to f3 (3.125 kHz). In the hysteresis loop L1, in a condition that the rotation speed is 250 rpm (at the frequency value f2), when the rotation speed N of the motor 400 is in a speed up state and the rotation speed N reaches the speed value N3 (300 rpm), the switch frequency fsw is still maintained at the frequency value f2 without jumping.

Similarly, in the hysteresis loop 1, in a condition that the rotation speed is 250 rpm (at the frequency value f3), when the rotation speed N of the motor 400 is in a speed up state and the rotation speed N reaches the speed value N3 (300 rpm), the switch frequency fsw is adjusted from f3 (3.125 kHz) up to f2 (6.25 kHz). In the hysteresis loop 1, in a condition that the rotation speed is 250 rpm (at the frequency value f3), when the rotation speed N of the motor 400 is in a speed down state and the rotation speed N reaches the speed value N4 (200 rpm), the switch frequency fsw is still maintained at the frequency value f3 without jumping.

In the hysteresis loop L2, in a condition that the rotation speed is 450 rpm (at the frequency value f2), when the rotation speed N of the motor 400 is in a speed up state and the rotation speed N reaches the speed value N1 (500 rpm), the switch frequency fsw is adjusted from f2 (6.25 kHz) up to f1 (12.5 kHz). In the hysteresis loop L2, in a condition that the rotation speed is 450 rpm (at the frequency value f2), when the rotation speed N of the motor 400 is in a speed down state and the rotation speed N reaches the speed value N2 (400 rpm), the switch frequency fsw is still maintained at the frequency value f2 without jumping.

In the hysteresis loop L2, in a condition that the rotation speed is 450 rpm (at the frequency value f1), when the rotation speed N of the motor 400 is in a speed down state and the rotation speed N reaches the speed value N2 (400 rpm), the switch frequency fsw is adjusted from f1 (12.5 kHz) down to f2 (6.25 kHz). In the hysteresis loop 12, in a condition that the rotation speed is 450 rpm (at the frequency value f1), when the rotation speed N of the motor 400 is in a speed up state and the rotation speed N reaches the speed value N1 (500 rpm), the switch frequency fsw is still maintained at the frequency value f1 without jumping.

Figure 5:
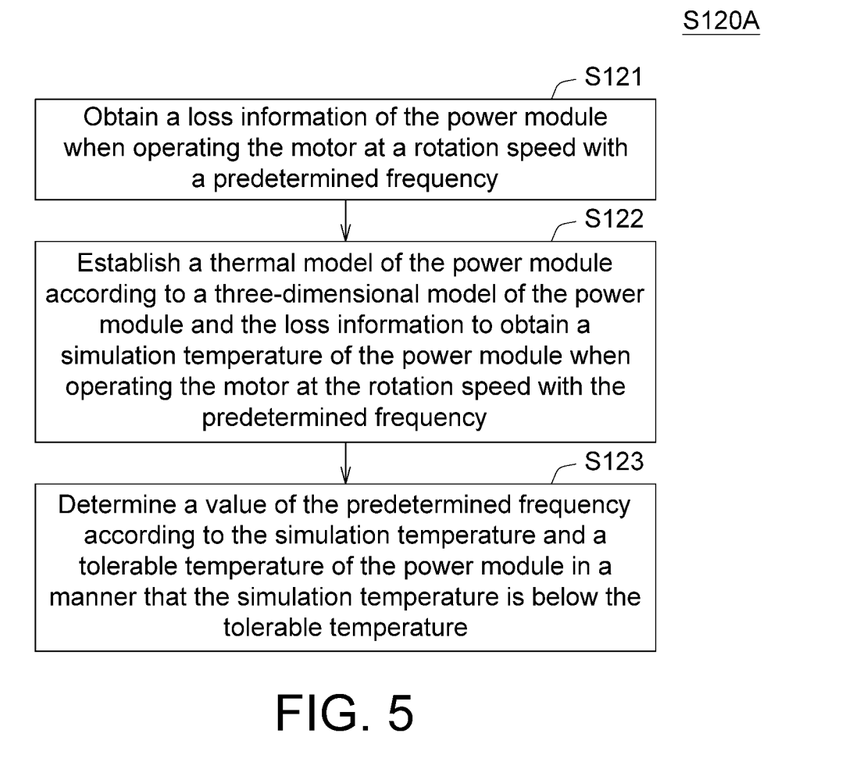
FIG. 5 illustrates one implement of the step of establishing the hysteresis control method.

FIG. 5 illustrates one implement of the step S120A of establishing the hysteresis control method, especially the step S120A of establishing at least one hysteresis loop of establishing the hysteresis control method. Referring to FIGS. 1, 2 and 5, first, in step S121, the loss calculation unit 120 obtains a loss information of the power module 310 when operating the motor 400 at a rotation speed with a predetermined frequency. Specifically, the loss calculation unit 120 may calculate the loss information of the power module 310 when operating the motor 400 at this rotation speed with the predetermined frequency based on a loading information of the motor 400.

Figure 6:
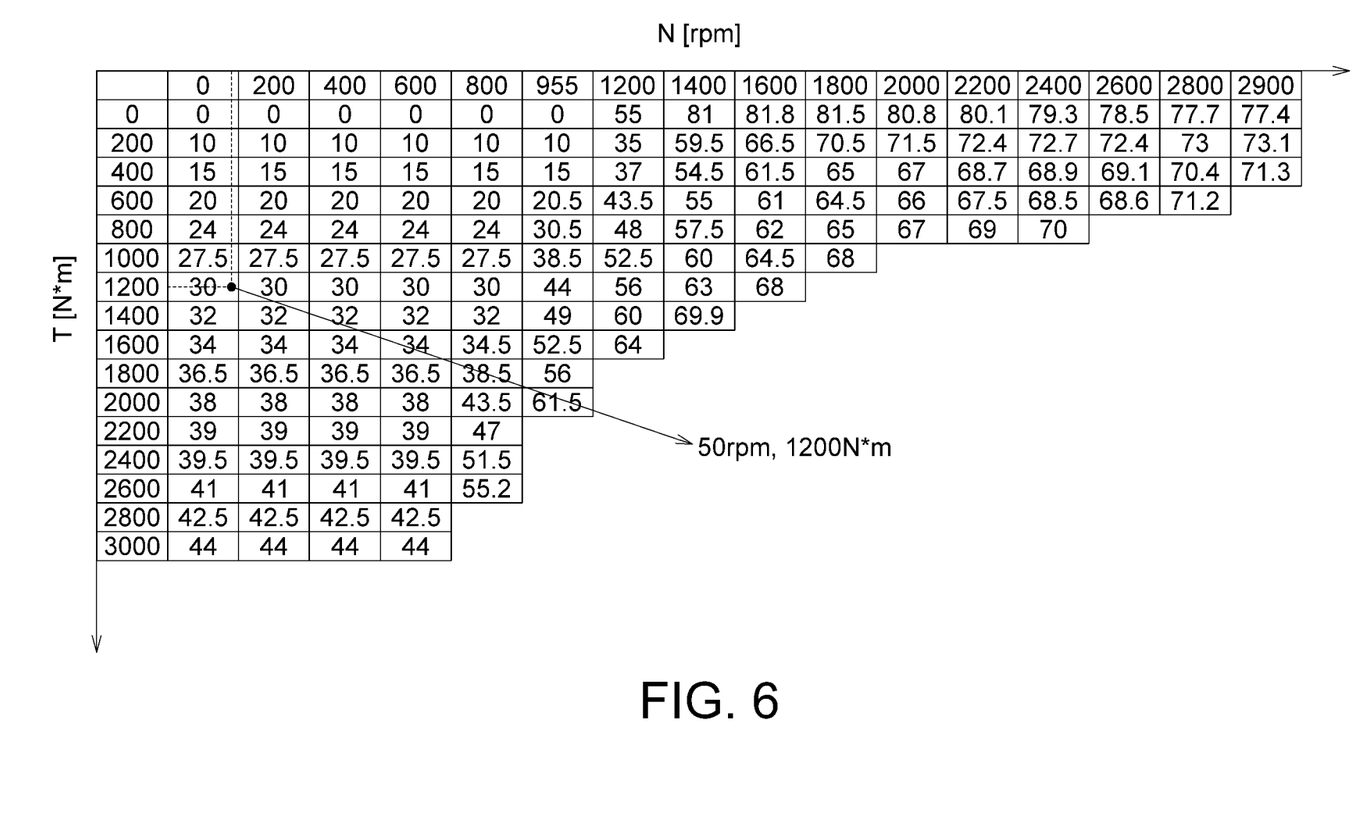
FIG. 6 illustrates a loading information of the motor according to one embodiment of the disclosure.

FIG. 6 illustrates a loading information of the motor 400 according to one embodiment of the disclosure, which is also the result of a lookup table being created. As shown in FIG. 6, the loading information records the current values (Ampere) for operating the motor 400 at different rotation speeds (N) and torques (T), with the speed range from 0 to 2900 rpm for the horizontal axis and the torque range from 0 to 3000 Nm for the vertical axis, representing the rotation speed and torque curve characteristic of the motor 400 under different current commands. For example, at the rotation speed of 50 rpm and the torque of 1200 Nm, the current value is 30 amps. Therefore, different motor types may correspond to different loading information, and the loading information of each motor may record rotation speed and torque curve, which may be obtained by manually building current command, or by model-based calibration using simulation software (e.g. finite element analysis software).

In step S121 of FIG. 5, the loss information may include conduction loss and switching loss. The conduction loss may include the conduction loss $P_{cond,IGBT}$ of the switching element (e.g., IGBT) and the conduction loss $P_{cond,DIODE}$ of the diode. The switching loss may include the switching loss $P_{sw,IGBT}$ of IGBT and the switching loss $P_{sw,DIODE}$ of the diode. The conduction loss $P_{cond,IGBT}$ and the switching loss $P_{sw,IGBT}$ of IGBT and the conduction loss $P_{cond,DIODE}$ and the switching loss $P_{sw,DIODE}$ of the diode may be expressed by the following equations (Eq. 1) to (Eq. 4) respectively:

$$P_{cond,IGBT} = f_{sw} \int_0^{\frac{T_0}{2}} V_{CE}(t) \times I_C \sin(\omega t) \times \frac{1}{2}[1 + M_i \sin(\omega t + \phi)]dt \quad \text{(Eq. 1)}$$

$$P_{sw,IGBT} = f_{sw} \times \sum_n [E_{on}(t) + E_{off}(t)] \quad \text{(Eq. 2)}$$

$$P_{cond,DIODE} = f_{sw} \int_0^{\frac{T_0}{2}} V_F(t) \times I_D \sin(\omega t) \times \frac{1}{2}[1 + M_i \sin(\omega t + \phi)]dt \quad \text{(Eq. 3)}$$

$$P_{sw,DIODE} = f_{sw} \times \sum_n E_{RR}(I_{nom}, V_{nom}) \times \frac{I_D}{I_{nom}} \frac{V_{DC}}{V_{nom}} \quad \text{(Eq. 4)}$$

$f_{sw}$ is the predetermined frequency of the power module 310; $T_0$ is the work period; $V_{CE}$ is the voltage between the collector and emitter of the switching element; $I_C$ is the collector current of the switching element; $M_i$ is the modulation index; $\varphi$ is $\cos^{-1}(pf)$, wherein pf is the power factor; $E_{on}$ is the open-state loss of the switching element; $E_{off}$ is the closed-state loss of the switching element; $V_F$ is the forward voltage of the diode; $I_D$ is the forward current of the diode; $E_{RR}$ is the reverse recovery loss; $I_{nom}$ is the rated current; $V_{nom}$ is the rated voltage; $V_{DC}$ is the DC voltage source.

Herein, the loss information $P_{sum}$ in step S121 is the sum of (Eq. 1) to (Eq. 4) above, that is, $P_{sum} = P_{cond,IGBT} + P_{sw,IGBT} + P_{cond,DIODE} + P_{sw,DIODE}$. According to the loading information in FIG. 6, if the current operating point of the motor 400 (i.e., the current value at a certain rotation speed and torque) is known, the loss information $P_{sum}$ of power module 310 may be obtained according to (Eq. 1) to (Eq. 4). For example, as shown in FIG. 6, the rated torque of the motor 400 in this example is 1200N*m. When operated at 50 rpm, the motor 400 is close to a blocked rotor state. When the current command at rotation speed of 50 rpm and torque of 1200N*m is input and the motor 400 is operated with a predetermined frequency $f_{sw}$, the current and voltage flowing through the switching element and diode may be brought into the above (Eq. 1) to (Eq. 4) to obtain the loss information $P_{sum}$ of the power module 310 operating the motor 400 in a blocked rotor state (rotation speed of 50 rpm and torque of 1200N*m) with this predetermined frequency $f_{sw}$.

Referring to FIGS. 1, 2 and 5, after the loss information $P_{sum}$ is obtained, in step S122, the temperature calculation unit 130 establishes a thermal model of the power module 310 according to a three-dimensional model M1 of the power module 310 and the loss information. In this step, the three-dimensional model M1 of the power module 310 may be obtained from the model building unit 110. The three-dimensional model M1 of the power module 310 is shown in FIG. 7A and is constructed, for example, by computer-aided design (CAD) software, containing the contours of various parts of the power module 310 at various viewing angles. The temperature calculation unit 130 may receive the three-dimensional model M1 of the power module 310, the physical parameters of the power module 310 (e.g., material properties such as thermal conductivity), and the loss information of the power module 310 obtained in step S121 as the input, and uses finite element analysis software (e.g., ANSYS) and sets boundary conditions for thermal simulation to obtain the thermal model of the power module 310. The temperature calculation model may show the temperature distribution of the various parts of the power module 310 after thermal simulation, so a simulation temperature may be obtained according to the thermal model, wherein the simulation temperature is the temperature of the power module 310 when operating the motor 400 at the rotation speed in step S121 with the predetermined frequency in step S121, and the simulation temperature represents the junction temperature of the power module 310.

Next, in step S123, the value of the predetermined frequency is determined according to the simulation temperature and the tolerable temperature of the power module 310 in a manner that the simulation temperature is below the tolerable temperature. If the simulation temperature is below the tolerable temperature, the predetermined frequency is utilized as the switch frequency of the power module 310 to operate the motor 400 at this rotation speed. However, if the simulation temperature exceeds the tolerable temperature, the predetermined frequency value is reduced until the simulation temperature is below the tolerable temperature.

In detail, step S121 to step S123 of FIG. 5 are illustrated with the condition of the motor 400 operated in a state which is close to the blocked rotor state (50 rpm, 1200N*m) to determine the most appropriate switch frequency for operating the motor 400 in the blocked rotor state. First, the predetermined frequency is set to 12.5 kHz to operate the motor 400 at 50 rpm, and the loss information $P_{sum}$ is obtained. Next, the thermal model is established according to the three-dimensional model M1 of the power module 310 (FIG. 7) and the loss information $P_{sum}$, and the simulation temperature of the power module 310 operating the motor 400 at 50 rpm with the predetermined frequency of 12.5 kHz is obtained. The simulation temperature is then compared with the tolerable temperature. If the simulation temperature exceeds the tolerable temperature, the predetermined frequency is lowered, for example, to 6.125 kHz, the above steps are repeated to obtain the loss information $P_{sum}$ of the power module 310 operating the motor 400 at 50 rpm with 6.125 kHz, the simulation temperature of the power module 310 operating the motor 400 at 50 rpm with the predetermined frequency of 6.125 kHz is obtained, and the simulation temperature is compared with the tolerable temperature again. If the simulation temperature still exceeds the tolerable temperature, the predetermined frequency is further reduced, for example to 3.125 kHz. Finally, the simulation temperature of the power module 310 operating the motor 400 at 50 rpm with the predetermined frequency of 3.125 kHz does not exceed the tolerable temperature, and 3.125 kHz may therefore be determined as being the switch frequency for operating the motor 400 at 50 rpm. In a similar manner, an appropriate switch frequency for each rotation speed range may be obtained, as shown in the hysteresis control method in FIG. 4.

In brief, as may be seen from the embodiment in FIG. 4 (hysteresis curve of rotation speed and frequency), operating the motor 400 with the frequency value f1 at any rotation speed greater than the speed value N2 (400 rpm), including N1, may ensure that the temperature of the power module 310 is below its tolerable temperature. Operating the motor 400 with the frequency value f2 at any rotation speed greater than the speed value N4 (200 rpm) and below or equal to the speed value N2 (400 rpm), including N2 and N3, may ensure that the temperature of the power module 310 is below its tolerable temperature. Operating the motor 400 with the frequency value f3 at any rotation speed below or equal to the speed value N4 (200 rpm), or even close to the blocked rotor state, including N0 and N4, may ensure that the temperature of the power module 310 is below its tolerable temperature.

This is because when the rotation speed is gradually reduced, the switching loss of the power module 310 dominates the main factor causing overheating compared to the conduction loss. Therefore, lowering the switch frequency may effectively reduce the temperature to avoid exceeding the tolerable temperature of the power module 310.

Conversely, if the rotation speed increases in a gradual upward trend, the switch frequency may be adjusted up again to achieve the maximum performance of the driving system 1. The switch frequency may be adjusted under a condition without damaging the peripheral electrical properties of the power module 310, so as to avoid high voltage ripple caused by low frequency operation. Thus, as shown in FIG. 4, when the rotation speed (starting from the frequency value f3) rises to the speed value N3, the switch frequency may be adjusted up from the frequency value f3 to the frequency value f2 accordingly, instead of continuing to operate with the lower frequency value f3; when the rotation speed (with the frequency value f2) rises further to the speed value N1, the switch frequency may be adjusted up from the frequency value f2 to the frequency value f1 accordingly, instead of continuing to operate with the lower frequency value f2.

With respect to the frequency values f1, f2 and f3 mentioned above, the frequency values f1, f2 and f3 may be determined by the way of simulation according to the aforementioned contents to obtain the simulation temperature corresponding to the junction temperature of the power module 310, and whether the simulation temperature exceeds the tolerable temperature is determined. In addition, it is also possible to verify whether the temperature of the thermal resistor obtained from experiment corresponds to the temperature of the thermal resistor obtained from the simulation by means of actual experiment under the same conditions, in order to verify the accuracy of the simulation and ensure that the junction temperature under simulation matches the temperature under actual experiment.

For example, if the motor 400 is respectively operated with the frequency values f1, f2, and f3 (12.5 kHz, 6.25 kHz, and 3.125 kHz) at a rotation speed of 50 rpm and a torque of 1200N*m, the simulation temperature of the thermal resistor (about 58° C., 40° C., and 30° C., respectively) matches the temperature of the thermal resistor under actual experiment (51° C., 36° C., and 29° C., respectively), which shows that the results of simulation and actual experimental correspond to each other, thus verifying that the frequency values f1, f2, and f3 through simulation are appropriate.

In summary, the operation method and operation device of the motor driver for driving a motor according to the disclosure may provide a thermal protection mechanism: a hysteresis control method is used to adjust the switch frequency of the power module for operating the motor according to the change of rotation speed of the motor and the current switch frequency. In addition, the hysteresis control method is developed by evaluating the junction temperature, so as to ensure that the motor driver operates in a safe and secure manner, and further to maximize the performance of the driving system.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operation method of a motor driver for driving a motor, the operation method comprising:
    establishing a hysteresis control method; and
    adjusting a switch frequency of a power module for operating the motor by using the hysteresis control method according to a change of rotation speed of the motor and a current switch frequency;
    wherein step of establishing the hysteresis control method comprises:
        obtaining a loss information of the power module when operating the motor at a rotation speed with a predetermined frequency;
        establishing a thermal model of the power module according to a three-dimensional model of the power module and the loss information to obtain a simulation temperature of the power module when operating the motor at the rotation speed with the predetermined frequency; and
        determining a value of the predetermined frequency according to the simulation temperature and a tolerable temperature of the power module in a manner that the simulation temperature is below the tolerable temperature, wherein the predetermined frequency in a condition that the simulation temperature is below the tolerable temperature is utilized as the switch frequency for operating the motor at the rotation speed.

2. The operation method according to claim 1, wherein the hysteresis control method comprises at least one hysteresis loop.

3. The operation method according to claim 2, wherein the at least one hysteresis loop comprises operating the motor at a rotation speed between a first rotation speed and a second rotation speed lower than the first rotation speed with a first switch frequency and a second switch frequency lower than the first switch frequency.

4. The operation method according to claim 3, wherein:
    when the current switch frequency is at the first switch frequency and the rotation speed of the motor reaches the second rotation speed, the current switch frequency is adjusted down to the second switch frequency; and
    when the current switch frequency is at the second switch frequency and the rotation speed of the motor reaches the first rotation speed, the current switch frequency is adjusted up to the first switch frequency.

5. The operation method according to claim 3, wherein:
    when the current switch frequency is at the first switch frequency and the rotation speed of the motor changes in a range greater than the second rotation speed and less than or equal to the first rotation speed, the current switch frequency is maintained; and
    when the current switch frequency is at the second switch frequency and the rotation speed of the motor changes in a range greater than or equal to the second rotation speed and less than the first rotation speed, the current switch frequency is maintained.

6. The operation method according to claim 1, wherein the simulation temperature corresponds to a junction temperature of the power module.

7. The operation method according to claim 1, wherein the loss information comprises a conduction loss and a switching loss.

8. The operation method according to claim 1, wherein the step of obtaining the loss information of the power module when operating the motor at the rotation speed with the predetermined frequency comprises:
    obtaining a loading information of the motor, the loading information comprising current values for operating the motor at different rotation speed and torque; and
    calculating the loss information of the power module when operating the motor at the rotation speed with the predetermined frequency according to the current value of the loading information for operating the motor at the rotation speed.

9. An operation device of a motor driver for driving a motor, the operation device comprising:
    a control unit configured for adjusting a switch frequency of a power module for operating the motor by a hysteresis control method according to a change of rotation speed of the motor and a current switch frequency;
    a loss calculation unit configured for obtaining a loss information of the power module when operating the motor at a rotation speed with a predetermined frequency; and
    a temperature calculation unit configured for establishing a thermal model of the power module according to a three-dimensional model of the power module and the loss information to obtain a simulation temperature of the power module when operating the motor at the rotation speed with the predetermined frequency;
    wherein a value of the predetermined frequency is determined according to the simulation temperature and a tolerable temperature of the power module in a manner that the simulation temperature is below the tolerable temperature, and the predetermined frequency in a condition that the simulation temperature is below the tolerable temperature is utilized as the switch frequency for operating the motor at the rotation speed.

10. The operation device according to claim 9, wherein the hysteresis control method comprises at least one hysteresis loop.

11. The operation device according to claim 10, wherein the at least one hysteresis loop comprises operating the motor at a rotation speed between a first rotation speed and a second rotation speed lower than the first rotation speed with a first switch frequency and a second switch frequency lower than the first switch frequency.

12. The operation device according to claim 11, wherein:
when the current switch frequency is at the first switch frequency and the rotation speed of the motor reaches the second rotation speed, the current switch frequency is adjusted down to the second switch frequency; and
when the current switch frequency is at the second switch frequency and the rotation speed of the motor reaches the first rotation speed, the current switch frequency is adjusted up to the first switch frequency.

13. The operation device according to claim 11, wherein:
when the current switch frequency is at the first switch frequency and the rotation speed of the motor changes in a range greater than the second rotation speed and less than or equal to the first rotation speed, the current switch frequency is maintained; and
when the current switch frequency is at the second switch frequency and the rotation speed of the motor changes in a range greater than or equal to the second rotation speed and less than the first rotation speed, the current switch frequency is maintained.

14. The operation device according to claim 9, wherein the simulation temperature corresponds to a junction temperature of the power module.

15. The operation device according to claim 9, wherein the loss information comprises a conduction loss and a switching loss.

16. The operation device according to claim 9, wherein the loss calculation unit is configured for calculating the loss information of the power module when operating the motor at the rotation speed with the predetermined frequency according to a current value of a loading information for operating the motor at the rotation speed, and the loading information comprises current values for operating the motor at different rotation speed and torque.

* * * * *